United States Patent
Rockelmann et al.

(10) Patent No.: US 8,636,315 B2
(45) Date of Patent: Jan. 28, 2014

(54) ROLLER BLIND ARRANGEMENT, IN PARTICULAR FOR A VEHICLE, AND ROOF ARRANGEMENT

(75) Inventors: Andreas Rockelmann, München (DE); Marco Thalhammer, Munich (DE); Martin Walser, Unterbrunn (DE); Erwin Steiner, Weilheim (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 13/375,457

(22) PCT Filed: Jul. 23, 2010

(86) PCT No.: PCT/DE2010/000885
§ 371 (c)(1),
(2), (4) Date: Mar. 30, 2012

(87) PCT Pub. No.: WO2011/012116
PCT Pub. Date: Feb. 3, 2011

(65) Prior Publication Data
US 2012/0187725 A1    Jul. 26, 2012

(30) Foreign Application Priority Data
Jul. 31, 2009    (DE) .......................... 10 2009 035 427

(51) Int. Cl.
*B60J 3/02*    (2006.01)
(52) U.S. Cl.
USPC ......................................................... 296/214
(58) Field of Classification Search
USPC ......................................................... 296/214
See application file for complete search history.

(56) References Cited

U.S. PATENT DOCUMENTS

| 2,383,015 A | 8/1945 | Pratt |
| 2,894,578 A | 7/1959 | Caesar et al. |

(Continued)

FOREIGN PATENT DOCUMENTS

| DE | 20 2005 006 415 U1 | 6/2005 |
| DE | 202006003831 U1 | 6/2006 |

(Continued)

OTHER PUBLICATIONS

International Preliminary Report on Patentability for PCT/DE2010/000885 dated Feb. 7, 2012 (English translation).
International Search Report for PCT/DE2010/000885 dated Sep. 30, 2010.

*Primary Examiner* — Dennis Pedder
(74) *Attorney, Agent, or Firm* — Marshall, Gerstein & Borun LLP

(57) ABSTRACT

A roller blind arrangement, in particular for a vehicle, with a roller blind web. The roller blind web can be wound up at least at one end by a winding device to form a roller blind winding having a geometrical center axis. The roller blind web can be unwound in an unwinding direction. The winding device has a guide element arranged with respect to the geometrical center axis of the roller blind winding in a direction essentially opposite to the unwinding direction and is designed to limit a movement of the roller blind winding in the direction opposite to the unwinding direction. The invention also relates to a roof arrangement with a roof opening, a roof opening frame that bounds the roof opening, and a roller blind arrangement. The roller blind arrangement is arranged in the roof opening and is mechanically coupled to the roof opening frame.

6 Claims, 1 Drawing Sheet

(56) References Cited

U.S. PATENT DOCUMENTS

| | | |
|---|---|---|
| 4,825,921 A * | 5/1989 | Rigter .................... 160/23.1 |
| 7,530,630 B2 | 5/2009 | Jugl et al. |
| 7,590,630 B2 | 9/2009 | Richter |
| 1,022,642 A1 | 9/2011 | Zendath |
| 2002/0046816 A1 | 4/2002 | Judkins |
| 2011/0056632 A1 | 3/2011 | Thalhammer et al. |

FOREIGN PATENT DOCUMENTS

| | | |
|---|---|---|
| DE | 10 2007 021 049 A1 | 11/2008 |
| DE | 102007041298 A1 | 3/2009 |
| EP | 1 900 560 A1 | 3/2008 |
| EP | 1992511 A2 | 11/2008 |
| WO | WO-2009033439 A1 | 3/2009 |

* cited by examiner

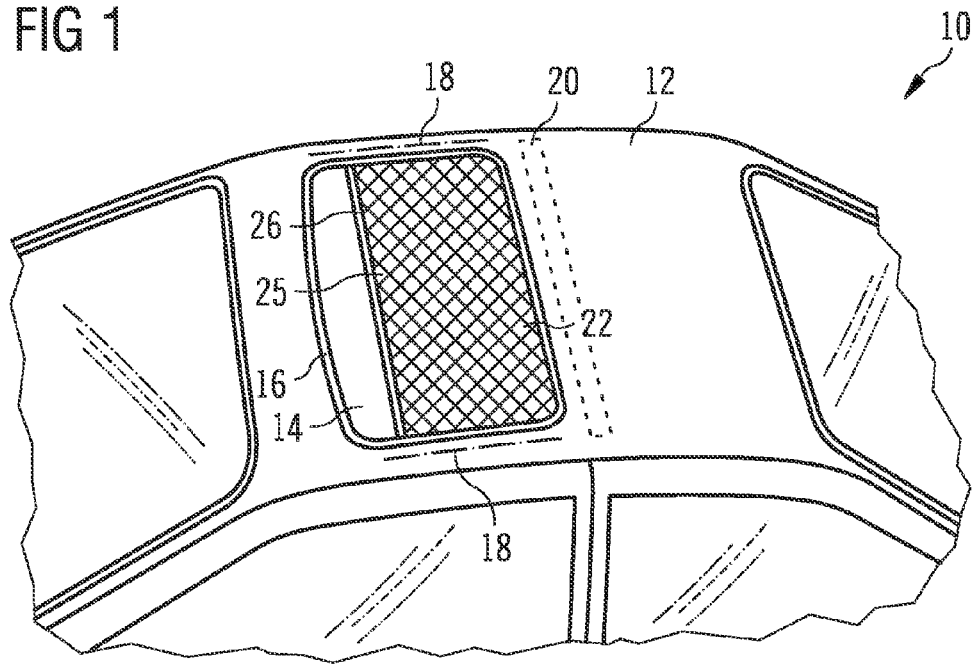
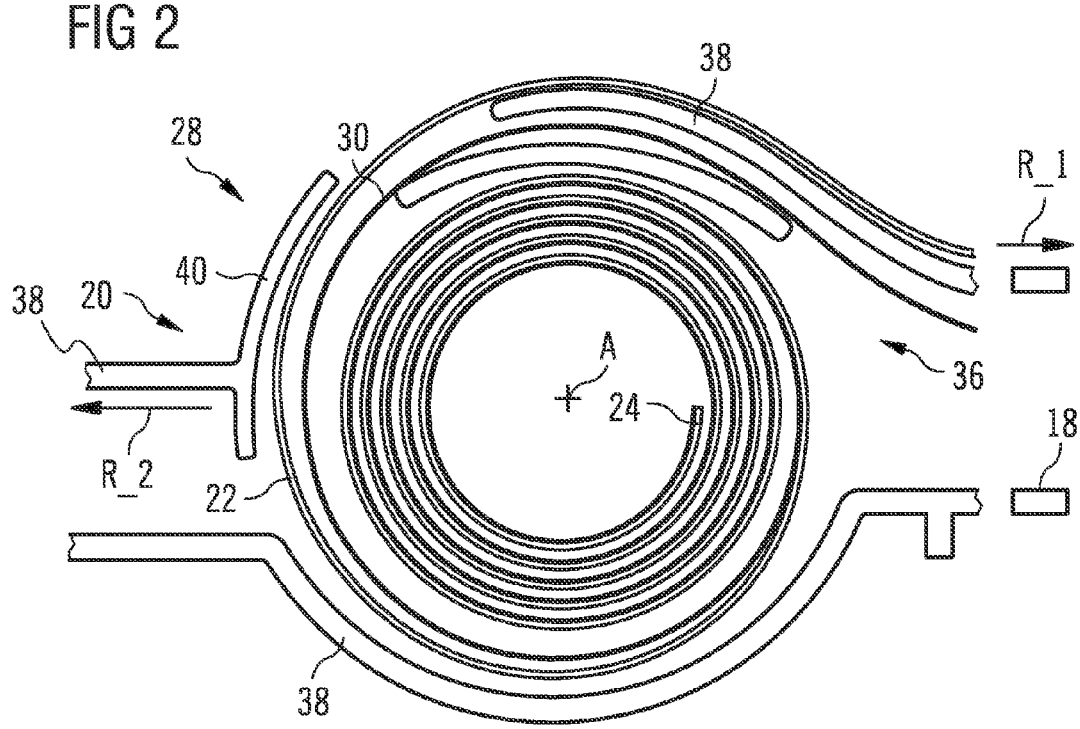

ROLLER BLIND ARRANGEMENT, IN PARTICULAR FOR A VEHICLE, AND ROOF ARRANGEMENT

BACKGROUND OF THE INVENTION

1. Field of the Invention

The invention relates to a roller blind arrangement, in particular for a vehicle, with a roller blind web which can be wound up at least at one end by means of a winding device to form a roller blind winding and can be unwound in an unwinding direction.

2. Related Technology

In roller blind arrangements according to the prior art, the roller blind web can be wound up without further, additional parts to form a roller blind winding which is arranged in a predetermined region in the vehicle. During very rapid winding up of the roller blind web in the longitudinal direction of the vehicle, the roller blind winding may be greatly accelerated, thus making it possible for jamming or erroneous winding up to occur.

SUMMARY OF THE INVENTION

It is the object of the invention to specify a roller blind arrangement of the type mentioned at the beginning and a roof arrangement, which enable a simple construction at low costs, but nevertheless permit reliable operation of the roller blind arrangement.

This object is achieved according to a first aspect of the invention by a roller blind arrangement of the type mentioned at the beginning, with a guide element which is arranged with respect to the geometrical center axis of the roller blind winding in a direction essentially opposite to the unwinding direction. The guide element is designed to limit a movement of the roller blind winding in the direction opposite to the unwinding direction. The roller blind winding is accommodated in housing elements which are designed in the form of a winding trough and cover and by means of which the position of the roller blind winding is limited upward and downward. The winding device has a spring which is preferably formed as a thin metal strip from a spring steel sheet. The guide element is arranged relative to the spring in such a manner that bulging of the spring is effectively prevented. The geometrical center axis of the roller blind winding runs through the center point of the substantially circular cross-sectional area of the roller blind winding.

Whereas, in the case of the roller blind arrangements according to the prior art, careful and not too rapid winding up of the roller blind web in the longitudinal direction of the vehicle is required, the present roller blind arrangement enables very rapid winding up of the roller blind web without the roller blind web being able to bulge in the region of the roller blind winding and therefore becoming jammed in the roller blind arrangement. Overall, such a bulging of the entire roller blind winding can thus be effectively prevented. A further advantage of a roller blind arrangement of this type is that the winding device can be configured so as to be mechanically very simple.

In an advantageous embodiment, the guide element is of sheetlike design.

This has the advantage that the guide element can be of very lightweight and nevertheless mechanically stable design. Furthermore, a sheetlike guide element can be produced very simply and cost-effectively.

In a further advantageous embodiment, the guide element is designed as an arc of a circle. The center point of the arc of the circle is the geometrical center axis of the roller blind winding in the wound up state.

The effect which can therefore be advantageously achieved is that the shape of the guide element can be very readily matched to the outside of the roller blind winding and can therefore assist neat winding up of the roller blind web.

In a further advantageous embodiment, the arc of the circle of the guide element encloses an angle of 45° with respect to the geometrical center axis of the roller blind winding. This has the advantage that the roller blind winding can be guided in a significant part of the outside thereof by the guide element.

In a further advantageous embodiment, the roller blind arrangement can be actuated manually. This enables a very simple construction of the roller blind arrangement.

The roller blind arrangement may also be converted in a simple manner from manual operation to electric operation. For this purpose, the roller blind web is coupled, for example in the region of the tension bow, to a motor.

According to a second aspect of the invention, a roof arrangement has a roof opening, a roof opening frame which bounds the roof opening, and a roller blind arrangement according to the first aspect of the invention. The roller blind arrangement is arranged in the roof opening and is mechanically coupled to the roof opening frame.

BRIEF DESCRIPTION OF THE DRAWINGS

The invention is explained in more detail below with reference to exemplary embodiments. In the figures:

FIG. 1 shows a schematic view of a roof arrangement of a vehicle, and

FIG. 2 shows a schematic view of a roller blind arrangement.

Elements of identical construction or function are identified by the same reference numbers throughout the figures.

DETAILED DESCRIPTION

FIG. 1 illustrates a vehicle 10, with a vehicle roof 12 which is provided with a roof opening 14 which is either closed or can be at least partially opened up by means of a displaceable sliding roof cover.

The roof opening 14 is bounded by a roof opening frame 16 formed on the vehicle roof 12. The roof opening frame 16 preferably has guide rails 18 which are arranged on both sides and in which a roller blind arrangement 20, which is illustrated in detail in FIG. 2, is arranged below the displaceable sliding roof cover. Metals or plastics are suitable material for the guide rails 18.

The roller blind arrangement 20 has a roller blind web 22 which, with respect to the vehicle 10, can be displaced forward in an unwinding direction R_1 and rearward in a direction R_2 opposite to the unwinding direction R_1. If the roller blind web 22 is pushed completely to the rear, the roof opening 14 is completely opened up. Sunlight and ambient air can then enter the vehicle interior without hindrance. If, by contrast, the roller blind web 22 is pushed completely to the front, the roof opening 14 is covered by the roller blind web 22, and therefore direct sunlight and ambient air can only partially enter the vehicle interior.

At one end 24 of the roller blind web 22, which end is the rear end of the roller blind web 22 with respect to the longitudinal direction of the vehicle, the roller blind web 22 can be completely wound up, as illustrated in detail below. A tension bow 26 is arranged at a further end 25 of the roller blind web 22, which end is the front end of the roller blind web 22 with respect to the longitudinal direction of the vehicle, said tension bow being able to be actuated, in particular manually, by the vehicle occupant in order thereby to push the roller blind web 22 to the front or to the rear. The longitudinal edges of the roller blind web 22, i.e. the right and the left edge of the roller blind web 22, are arranged in the guide rails 18, which are arranged to the sides of the roof opening 14.

A winding device 28 is arranged in a region of the rear end of the roof opening 14. The winding device 28 has a spring 30. The spring 30 is preferably formed as a thin metal strip from spring steel sheet. The spring 30, when accommodated in the guide rails 18, has the spiral cross-sectional shape which is shown in FIG. 2. The spring 30 is designed in such a manner that it endeavors to roll up to form a winding when no external forces act thereon. The roller blind web 22 is connected to the springs 30 preferably only in the region at the rear end 24 of the roller blind web 22.

If the roller blind web 22 is displaced to the rear in order to open up the roof opening 14, the roller blind web 22 is wound up by the springs 30 by themselves to form a roller blind winding 36 having a geometrical center axis A. The roller blind web 22 is tautly tensioned owing to the pretensioning of the springs 30.

The roller blind winding 36 is preferably accommodated in housing elements 38 which are designed in the form of a winding trough and cover and by means of which the position of the roller blind winding 36 is limited in particular upward and downward. The housing elements 38 which are designed in the form of a winding trough and cover preferably merge as a single part into the guide rails 18.

The winding device 30 has a guide element 40. The guide element 40 is preferably coupled fixedly to the housing elements 38 or is formed integrally therewith. The guide element 40 is preferably formed from a metal or a plastic. The guide element 40 is arranged with respect to the geometrical center axis A of the roller blind winding 36 in the direction R_2 opposite to the unwinding direction R_1 of the roller blind web 22. The guide element 40 can limit a movement of the roller blind winding 36 in the direction R_2 opposite to the unwinding direction R_1. In order to achieve as small a mass as possible for the guide element 40, the latter is preferably of sheet-like design. The guide element 40 is preferably designed as an arc of a circle. The center point of the arc of the circle is preferably the geometrical center axis A of the roller blind winding 36. The arc of the circle of the guide element 40 preferably encloses an angle of 45° with respect to the geometrical center axis A of the roller blind winding 36.

By means of the formation of the guide element 40 as illustrated, it is possible, upon an acceleration of the roller blind winding 36 in the direction R_2 during rapid winding up of the roller blind web 22 opposite to the unwinding direction R_1, to limit said movement without slowing down the winding up movement. The roller blind web 22 can slide along the inside of the guide element 40 and can thus continue reliably to be wound up onto the roller blind winding 36. Bulging of the roller blind winding 36 and of the spring 30 can therefore also be effectively prevented.

In a preferred embodiment, the roller blind arrangement 20 can be actuated manually. In further embodiments, the roller blind arrangement 20 may also be actuated by means of a motor. By means of the provision of the guide element 40, it is possible, in a particularly simple and effective manner, to prevent the roller blind web 22 from accelerating out of the housing elements 38, which are designed in the form of a winding trough and cover, during very rapid winding up of the roller blind web 22 in order to open the roof opening 14, and to be able to prevent the roller blind web 22 from becoming jammed in the housing elements 38 or in the guide rail 18.

In all of the described embodiments of the invention, the arrangement of the roller blind arrangement in an openable vehicle roof is in particular possible. Other roof arrangements, in which a roller blind arrangement according to the invention could be used, are glass roofs in buildings, in particular in conservatories or house roofs. The roller blind webs do not necessarily have to serve for sun protection; protective grills against mosquitoes may, for example, advantageously also be actuated by the arrangement described.

The invention is not restricted to the exemplary embodiments specified.

Furthermore, it is possible to combine the features of the different exemplary embodiments with one another such that arrangements of this type are also covered by the invention.

The invention claimed is:

1. A roller blind arrangement with a roller blind web that can be wound up at least at one end by a winding device to form a roller blind winding having a geometrical center axis and can be unwound in an unwinding direction, wherein:
    the roller blind winding is accommodated in housing elements in the form of a winding trough and cover and by which a position of the roller blind winding is limited upwardly and downwardly,
    the winding device has a guide element arranged with respect to the geometrical center axis of the roller blind winding in a direction essentially opposite to the winding direction and is designed to limit a movement of the roller blind winding in the direction opposite to the unwinding direction, wherein the guide element is immovably coupled to the housing elements,
    the winding device for winding up the roller blind web to form a roller blind winding has a spring comprising a metal strip from a spring steel sheet, and
    the guide element is arranged relative to the spring in such a manner that bulging of the spring is prevented.

2. The roller blind arrangement according to claim 1, wherein the guide element is sheet-like.

3. The roller blind arrangement according to claim 1, wherein the guide element is shaped as an arc of a circle, and the center point of the arc of the circle is the geometrical center axis of the roller blind winding in a wound-up state.

4. The roller blind arrangement according to claim 3, wherein the arc of the circle of the guide element encloses an angle of 45° with respect to the geometrical center axis of the roller blind winding.

5. The roller blind arrangement according to claim 1, wherein the roller blind arrangement can be actuated manually.

6. A roof arrangement, with
a roof opening,
a roof opening frame which that bounds the roof opening, and
a roller blind arrangement according to claim 1, wherein the roller blind arrangement is arranged in the roof opening and is mechanically coupled to the roof opening frame.

* * * * *